United States Patent

Grattan

[15] 3,670,597
[45] June 20, 1972

[54] AUTOMATIC TRANSMISSION FOR AUTOMOTIVE VEHICLES

[72] Inventor: Worthin F. Grattan, 4224 South Bruce, Las Vegas, Nev. 89109

[22] Filed: Nov. 25, 1970

[21] Appl. No.: 92,815

[52] U.S. Cl. ..................74/752 E, 74/731, 74/763, 192/4 A
[51] Int. Cl. ............F16h 5/42, F16h 47/08, B60k 29/00
[58] Field of Search..........................74/752 E, 731

[56] References Cited

UNITED STATES PATENTS

| | | | |
|---|---|---|---|
| 1,843,193 | 2/1932 | Banker | 74/752 E |
| 2,134,398 | 10/1938 | Cotterman | 74/731 |
| 2,142,866 | 1/1939 | Cotterman | 74/752 E |
| 2,198,072 | 4/1940 | Banker | 74/752 E |
| 2,201,848 | 5/1940 | Cotterman | 74/752 E |
| 3,327,565 | 6/1967 | Grattan | 74/752 E |

Primary Examiner—Carlton R. Croyle
Assistant Examiner—Thomas C. Perry
Attorney—Jack M. Wiseman

[57] ABSTRACT

An automatic transmission in which a drive shaft is coupled to a driven shaft through a centrifugal clutch, a fluid coupling, a forward planetary gear and a rear planetary gear. A shift lever is activated to lock-up the rear planetary gear for drive, neutral, reverse, and parking. Thus, the rear planetary gear is initially locked-up when the shift lever is in the drive position. In low drive, power is transmitted from the drive shaft to the driven shaft through the centrifugal clutch, the fluid coupling, and the forward planetary gear. After the vehicle speed reaches 20 m.p.h., the forward planetary gear locks-up and power is transmitted from the drive shaft directly to the driven shaft. When the vehicle speed reaches 40 m.p.h., the rear planetary gear will automatically shift into overdrive, and power is transmitted from the drive shaft to the driven shaft through the rear planetary gear.

4 Claims, 5 Drawing Figures

INVENTOR.
BY Jack M. Wesemen

INVENTOR.
WORTHIN F. GRATTAN

BY Jack M. Waseman

ATTORNEY

AUTOMATIC TRANSMISSION FOR AUTOMOTIVE VEHICLES

BACKGROUND OF THE INVENTION

In U.S. Pat. No. 3,327,565, issued to W. F. Grattan on June 27, 1967, for Automatic Transmission for Automotive Vehicles, the forward planetary gear locks up when the vehicle reaches a speed of 15 m.p.h. so that the torque multiplication is through the rear planetary gear. When the vehicle speed reaches 25 m.p.h., both the forward planetary gear and the rear planetary gear lock-up to place the transmission in direct drive.

Other U.S. Pats. issued to W. F. Grattan on Automatic Transmission Systems for Automotive Vehicles are as follows: Nos. 2,891,421, 3,115,792, 3,063,309, 2,797,594, 3,327,565, 2,699,237.

SUMMARY OF THE INVENTION

A shift lever is actuated into the drive position to lock-up a rear planetary gear and at a lower preselected vehicle speed, a forward planetary gear locks-up to give a direct drive for the transmission and at a higher preselected vehicle speed, the rear planetary gear automatically shifts into overdrive so that power is transmitted from a drive shaft to a driven shaft through the rear planetary gear.

By virtue of the foregoing arrangement, engine power output is automatically reduced at a preselected speed without reducing driving speed, whereby fuel consumption and engine wear is reduced.

DESCRIPTION OF THE DRAWINGS

FIG. 3 is a transverse sectional view taken along line 3—3 of FIG. 1a.

FIG. 4 is a sectional view taken along line 4—4 of FIG. 1a.

DETAILED DESCRIPTION OF THE PREFERRED EMBODIMENTS

Figure 1A:
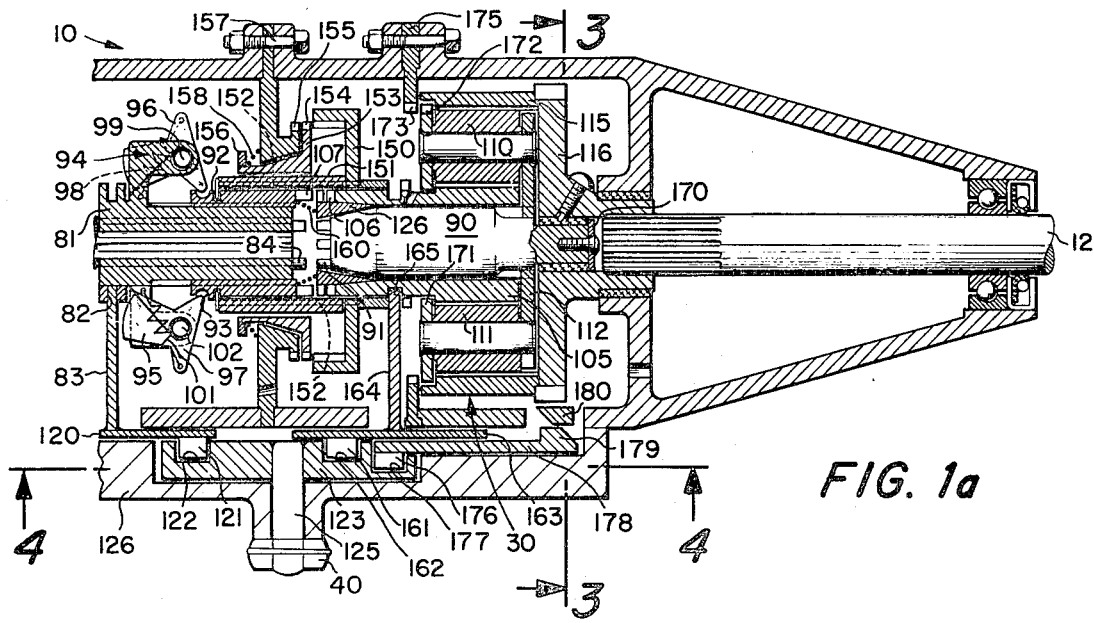
FIGS. 1a and 1b with FIG. 1b to the left of FIG. 1a is a diagrammatic longitudinal section of an automatic transmission embodying the present invention.
Figure 1B:
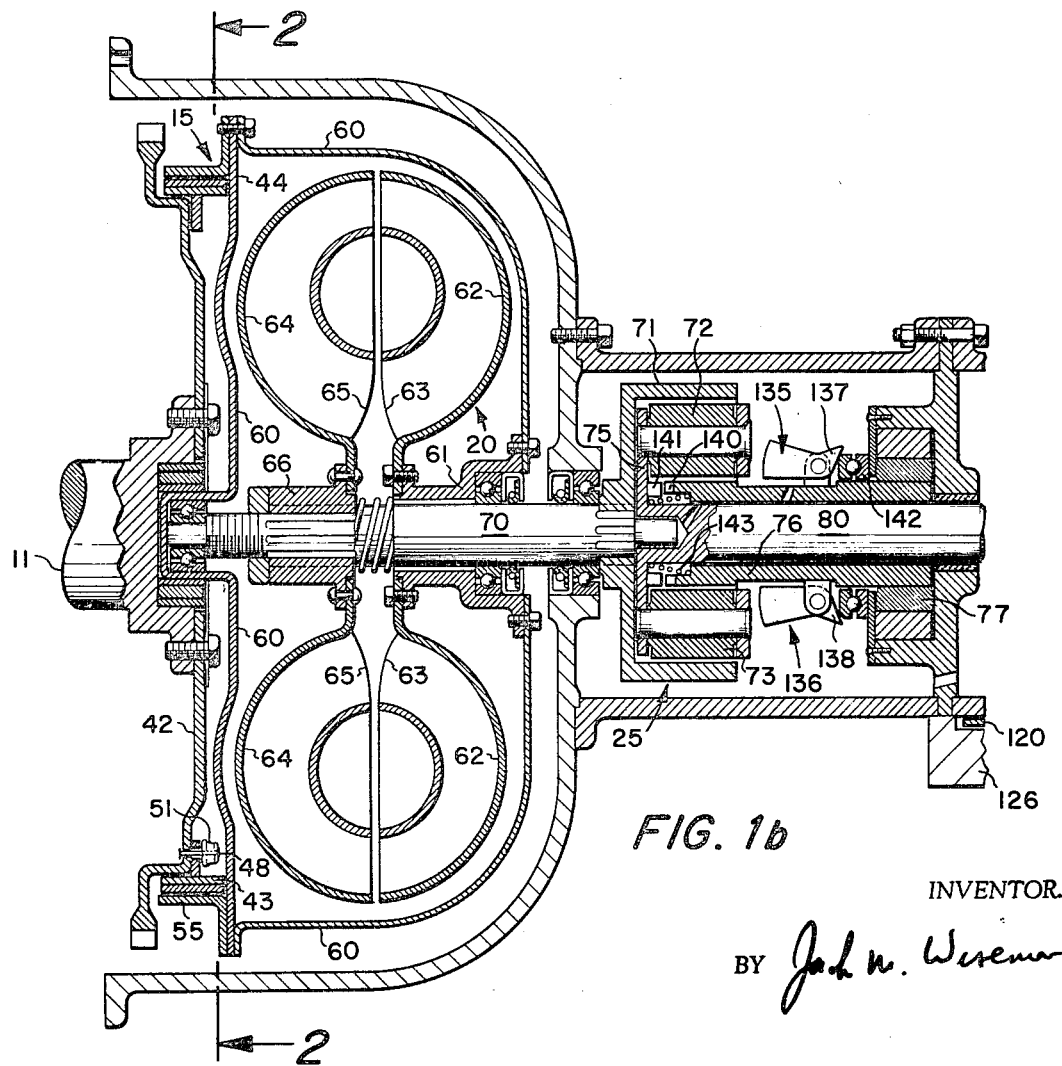

Illustrated in FIGS. 1a and 1b is the automatic transmission 10 of the present invention, which transmits power from an engine drive shaft 11 to an axially aligned driven shaft 12. The transmission 10 comprises a centrifugal clutch 15, a fluid coupling 20, a forward planetary gear 25 and a rear planetary gear 30.

When the engine is idle, the centrifugal clutch 15 is disengaged so that no power is transmitted through the transmission 10. An operator moves a shift lever 40 into a drive position, which causes the rear planetary gear 30 to lock-up. At low gear, power is transmitted from the drive shaft 11 to the driven shaft 12 through the centrifugal clutch 15, the fluid coupling 20 and the forward planetary gear 25. In the exemplary embodiment, when the vehicle speed reaches 20 m.p.h., the forward gear locks up and the drive shaft 11 transmits power directly to the driven shaft 12. When the vehicle speed reaches 40 m.p.h., in the exemplary embodiment, the rear planetary gear automatically shifts to overdrive so that power is transmitted from the drive shaft 11 to the driven shaft 12 through the rear planetary gear 30.

Thus, in the acceleration of the vehicle, the forward planetary gear 25 automatically locks-up prior to the automatic shifting of the rear planetary gear 30 into overdrive. The locking-up of the forward planetary gear 25 occurs at a lower preselected speed and the shifting of the rear planetary gear 30 into overdrive occurs at a higher preselected speed. When the vehicle speed reaches the higher preselected magnitude, the operator momentarily releases the accelerator pedal to remove the torque loads from the planetary gears and a reverse torque is applied by the momentum of the vehicle.

When decelerating the vehicle below 40 m.p.h., the rear planetary gear 30 automatically shifts from overdrive to lock-up. When decelerating the vehicle below 20 m.p.h., the forward planetary gear 25 unlocks and the transmission 10 is in low drive. When the vehicle is at rest, the centrifugal clutch 15 is disengaged and the engine idles while the shift lever 40 of the transmission 10 is in the drive position.

Figure 2:
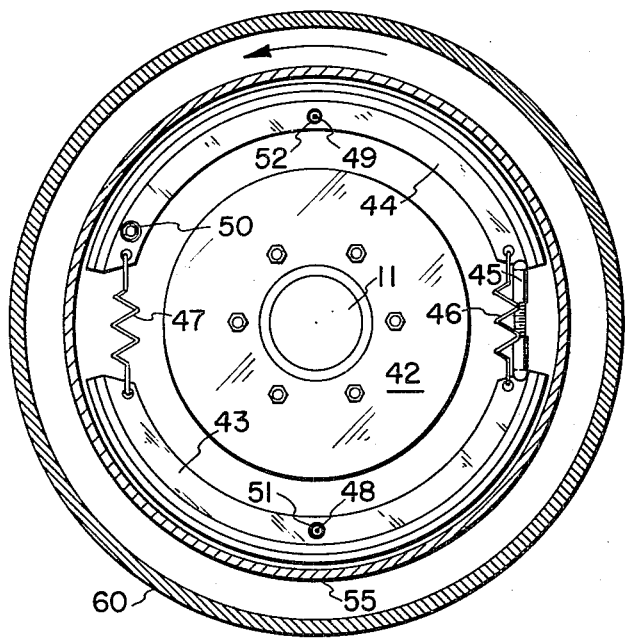
FIG. 2 is a transverse sectional view taken along line 2—2 of FIG. 1b.

As shown in Figs. 1a, 1b and 2, the centrifugal clutch 15 comprises a disc 42 with a central opening for receiving the drive shaft 11. Suitable bolts secure the disc 42 to the drive shaft 11 for rotation therewith. Along the outer wall of the disc 42 are suitable teeth for meshing with a starter, not shown, to crank the engine. Mounted on the disc 42 for radial movement are clutch shoes 43 and 44. A bolt 45 interconnects adjacent ends of the clutch shoes 43 and 44. Surrounding the bolt 45 and connected to the adjacent ends of the clutch shoes 43 and 44 is a spring 46, which urges the adjacent ends of the clutch shoes 43 and 44 toward one another. The opposite ends of the clutch shoes 43 and 44 are interconnected by a spring 47, which urges the opposite ends of the clutch shoes 43 and 44 toward one another. Suitable pins 48 and 49, surrounded by springs 51 and 52, respectively, attach the clutch shoes 43 and 44, respectively, onto the disc 42 for radial movement relative thereto. An anchor pin 50 holds the shoe 44 onto the disc 42 for pivotal movement thereabout. A clutch drum 55 is disposed radially outward from the clutch shoes 43 and 44 in confronting relation thereto.

Rotation of the drive shaft 11 imparts rotation to the disc 42. When the disc 42 rotates at a predetermined rate, the clutch shoes 43 and 44 will move radially outward against the urgency of the springs 46 and 47 under a centrifugal force to cause the clutch shoes 43 and 44 to engage the drum 55, whereby the drum 55 rotates with the disc 42. The frictional engagement between the clutch shoes 43 and 44 and the clutch drum 55 is sufficient to impart rotation to the drum 55. When the vehicle stops, the centrifugal force is not sufficient to overcome the action of the springs 46 and 47 and, consequently, the clutch shoes 43 and 44 move radially inward, to disconnect the clutch drum 55 from the drive shaft 11 through the disc 42. Hence, the transmission 10 is disconnected from the engine drive shaft 11 and the vehicle idles while the shift lever 40 is in drive position.

The clutch drum 55 is fixed to a forward wall of a housing 60 of the fluid coupling 20 to impart rotation thereto. Fixed to the housing 60 is a hub 61 of the fluid coupling 20, which, in turn, is fixed to an arcuate wall 62 of the fluid coupling 20. Thus, rotation of the housing 60 imparts rotation to the arcuate wall 62 through the hub 61. Mounted on the wall 62 are a plurality of vanes 63 for impelling oil contained by the arcuate wall 62. Confronting the arcuate wall 62 is a complementary arcuate wall 64. The arcuate walls 62 and 64 are disposed within the sealed housing 60 containing a supply of oil in excess of the capacity of the confronting walls 62 and 64. Mounted on the arcuate wall 64 are vanes 65. The oil impelled by the vanes 62 act upon the vanes 65 to cause the vanes 65 to impart rotation to the arcuate wall 64. The arcuate walls 62 and 64 with reduced diameter inner walls provide substantially a toroidal configuration.

Fixed to the arcuate wall 64 is a hub 66 that rotates with the wall 64. Received by the hubs 61 and 66 is an intermediate shaft or stub shaft 70 that is axially aligned with the drive shaft 11 and the driven shaft 12. The forward end of the shaft 70 is journalled for rotation within the wall of the housing 60 through suitable bearings and the rear end of the shaft 70 is journalled for free rotation in the increased diameter portion of the hub 61. The forward end of the shaft 70 is suitably splined to mesh with the splines of the hub 66, whereby rotation of the hub 66 imparts rotation to the shaft 70.

The fluid coupling 20 performs essentially as a clutch. At very low engine revolutions, there is almost a 100 percent slippage. As the engine speed increases, the slippage decreases. When the engine speed is high, the slippage approaches zero. The fluid coupling 20 serves to reduce the shock load on the transmission gears and the drive shaft.

Fixed to the rear end of the shaft 70 is an internal ring gear 71 of the forward planetary gear 25. Meshing with the ring gear 71 are pinion or planet gears 72 and 73, which are diametrically opposite from one another. The planet gears 72 and 73 are carried for rotation about their respective axes by a planet carrier 75. Also meshing with the planet gears 72 and 73 is a sun gear 76. A conventional one-way brake 77 engages the extended collar of the sun gear 76 to restrain the sun gear 76 against reverse rotation or counterclockwise rotation. Thus, rotation of the shaft 70 imparts rotation to the ring gear 71, which, in turn, imparts rotation to the pinion gears 72 and 73. When the sun gear 76 is restrained from rotating counterclockwise by the one-way brake 77, the pinion gears 72 and 73 will rotate about the sun gear 76 in the clockwise direction causing the planet carrier 75 to rotate therewith in the clockwise direction.

Fixed to the planet carrier 75 for rotation therewith is an intermediate or stub shaft 80, which is aligned axially with the stub shaft 70. The rear portion of the shaft 80 is splined; and mounted on the rear portion of the shaft 80 is a splined collar 81 that rotates with the shaft 80 and is slidably movable in the axial direction relative to the shaft 80.

A peripheral groove 82 is formed in the forward end of the collar 81, which receives a shifting fork 83. The shifting fork 83 imparts axial movement to the collar 81 relative to the shaft 80. On the rearward end of the collar 81 are formed teeth 84. Disposed in axial alignment with the intermediate shaft 80 is an intermediate or stub shaft 90. Formed on the forward end of the shaft 90 are teeth 91. When the collar 81 is moved axially rearward through the shifting fork 83 to mesh the teeth 84 with the teeth 91, a collar 92 meshes with the teeth 106 of the sun gear 105. Rotation of the shaft 80 imparts rotation to the shaft 90 and the sun gear 105 locks up with the planet gears 30. During the drive position of the shifting fork 83, the shaft 90 rotates clockwise and during the reverse position of the shifting fork 83, the shaft 90 does not rotate.

Surrounding the collar 81 at the rear end thereof is the splined collar 92. The collar 92 rotates with the rotation of the collar 81 and is movable in the axial direction relative to the collar 81. Formed on the forward end of the collar 92 is a peripheral groove 93. Centrifugal weights 94 and 95 are mounted on the collar 81 for rotation therewith. The centrifugal weights 94 and 95 include pivotally mounted spring loaded arms 96 and 97, respectively. The pivotal arms 96 and 97 are inwardly disposed and the free ends thereof rest in the groove 93 of the collar 92 at all times. Attached to the arm 96 are springs 98 and 99. Similarly, attached to the arm 97 are springs 101 and 102. Rotation of the collar 81 causes the weights of the centrifugal weights 94 and 95 to act against the urgency of the springs 99 and 102, respectively, under a centrifugal force. It is the springs and pins 99 and 102 that hold the inner parts of arms 96 and 97, respectively, from moving forward in the groove 93 of the collar 92 until a desired, preselected speed of rotation is attained by the collar 81. Once the desired, preselected speed of rotation of the collar 81 is attained, the inner part of the arms 96 and 97 shift forward in the groove 93 of the collar 92 against the urgency of the springs 98 and 101, respectively, which assist the forward shifting movement of the arms 96 and 97 as the springs 98 and 101 move over the central pivot point of the associated arms. Thus, when the collar 81 attains a desired, preselected speed of rotation the inner part of arms 96 and 97 shift forward automatically to engage at the forward ends the wall of the groove 93 of the collar 92 to slide the collar 92 forwardly.

Surrounding the shaft 90 for free rotation relative thereto is the sun gear 105 of the rear planetary gear 30. At the forward end of the sun gear 105 are teeth 106. Formed on the rear end of the collar 92 are teeth 107. When the collar 81 is shifted rearwardly by the shifting fork 83 so that the teeth 107 of the collar 92 mesh with the teeth 106 of the sun gear 105, rotation of the collar 92 will impart rotation to the sun gear 105. The teeth 107 and 106 are formed with prescribed angular mating relation to prevent separation while the vehicle travels at a preselected speed. When the vehicle travels at a speed in excess of the preselected speed, the teeth 107 and 106 will automatically separate in a manner hereinafter described.

Meshing with the sun gear 105 are planet gears 110 and 111, which are carried by a planet carrier 112 for rotation about their respective axes. The planet gears 110 and 111 are diametrically oppositely located from one another. Rotation of the carrier 112 imparts rotation to the planet gears 110 and 111. Meshing with the planet gears 110 and 112 is an internal ring gear 115. Fixed to the ring gear 115 is a parking plate 116. The parking plate 116 meshes with the driven shaft 12 through splines to impart rotation to the driven shaft 12.

The planet carrier 112 is splined to mesh with the splines of the shaft 90 so that rotation of the shaft 90 imparts rotation to the planet carrier 112. The planet carrier 112 is also movable in the axial direction relative to the shaft 90. Thus, rotation of the shaft 90 imparts rotation to the planet carrier 112, which, in turn, imparts rotation to the planet gears 110 and 111. In turn, the planet gears 110 and 111 cause rotation of the ring gear 115 to rotate the parking plate 116, thereby rotating the driven shaft 12.

For shifting the transmission 10 into drive, the shifting fork 83 is fixed to a plate 120. Projecting outwardly from the plate 120 is a follower 121. The follower 121 is received by an arcuate groove 122 (Figs. 1 and 4) formed in a disc shift plate 123. Fixed to the shift plate 123 centrally thereof is a control rod 125. The shift handle 40 is attached to the control rod 125. A cover plate 126 supports the shift plate 123. Suitable detent grooves 130-133 are formed in the periphery of the shift plate 123. A spring loaded detent 134 holds the shift plate 123 in its selected shift position by occupying the appropriate detent groove.

Figure 4:
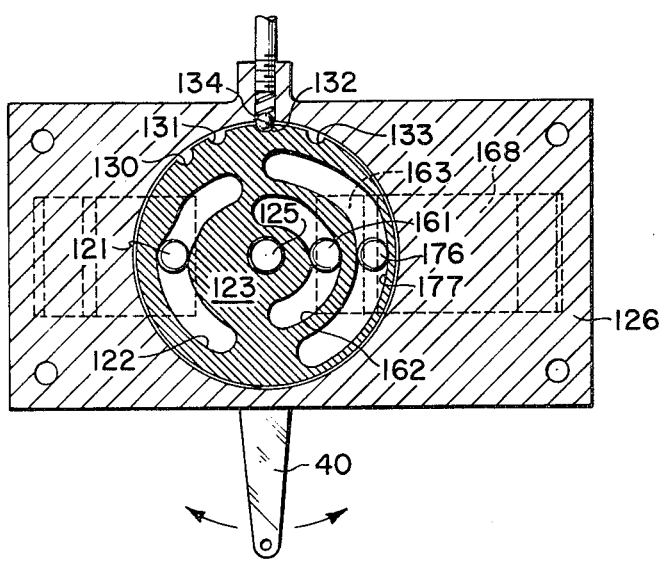

When the shift handle 40 is moved rearwardly into drive position, the shift plate 123 is rotated in the counterclockwise direction as viewed in FIG. 4. The follower 121 thereby moves rearwardly and the plate 120 with the shifting fork 83 is also moved rearwardly. This action causes the collar 81 along with the collar 92 to move rearwardly, thereby causing the teeth 84 of the collar 81 to mesh with the teeth 91 of the shaft 90 and causing the teeth 107 of the collar 92 to mesh with the teeth 106 of the sun gear 105. A synchronizing ring 126 produces a synchronizing meshing between the teeth 106 and 107.

With the shift lever 40 in drive position, rotation of the shaft 80 imparts rotation to the shaft 90 through the collar 81, teeth 84, and teeth 91, and also imparts rotation to the sun gear 105 of the rear planetary gear 30 through the collar 81, collar 92, teeth 107 and teeth 106. Thus, the sun gear 105 and the shaft 90 rotate in unison to lock-up the rear planetary gear 30. The rear planetary gear 30 rotates as a unit and the planet carrier 115 imparts rotation to the parking plate 116, which, in turn, rotates the driven shaft 12.

As previously described, when the input shaft 11 rotates at a relatively slow rate, the clutch 43 and 44 are held inwardly by the springs 46 and 47. After the input shaft 11 attains a preselected speed of rotation, the clutch shoes 43 and 44 are urged outwardly against the urgency of the springs 46 and 47 to engage the drum 55, whereby the drum 55 rotates with the shaft 11 through the centrifugal clutch 15. The drum 55, in turn, imparts rotation to the arcuate wall 62 of the fluid coupling 20. This action causes the impelling of oil against the blades 65 of the arcuate wall 64 and through the transfer of kinetic energy, the arcuate wall 64 rotates.

The stub shaft 70 is fixed to the hub 66 of the arcuate wall 64 so that the shaft 70 is rotated through the fluid coupling 20. The ring gear 71 of the forward planetary gear 25 is fixed to the shaft 70 for rotation therewith. By rotating the ring gear 71, the pinion gears 72 and 73 rotate about their respective axes. Since the one-way brake 77 holds the sun gear 76 against counterclockwise rotation, the planet carrier 75 rotates in the clockwise rotation. The shaft 80 is rotated in the clockwise direction by the carrier 75.

By rotating the shaft 80, rotation is imparted to the collar 81 and to the collar 92. When the shift lever 40 is in the drive position, the shaft 90 is rotated through the meshing of the teeth 84 and the teeth 91. Likewise, when the shift lever 40 is in the drive position, the sun gear 106 of the rear planetary gear 30 rotates through the meshing of the teeth 107 and the teeth 106. Thereupon, the planet gears 110 and 111 rotate about their respective axes to rotate the planet carrier 115 for rotating the parking plate 116. This occurs while the rear planetary gear 30 is locked-up. The parking plate 116, in turn, imparts rotation to the driven shaft 12. During the above-described period, the transmission 10 is considered in low gear.

When the drive shaft 11 rotates at a preselected rate so that the vehicle travels in the exemplary embodiment at the speed of 20 m.p.h., it is intended for the planetary gear 25 to lock-up. This is similar to a manual shift being shifted into second. Toward this end, centrifugal weights 135 and 136 are mounted on the sun gear 76 of the forward planetary gear 25. The centrifugal weights 135 and 136 include integrally formed arms 137 and 138, respectively, which are pivotally attached to the extended shaft of the sun gear 76 by pins. When the speed of rotation is above a preselected rate, the centrifugal weights are urged outwardly to force the sun gear 76 forwardly. In so doing, teeth 140 at the forward end of the sun gear 76 meshes with teeth 141 on the rear circumference of the planet carrier 75.

At this time, the sun gear 76 was not rotating. When the operator of the vehicle decelerates the vehicle, the momentum of the vehicle in trying to keep the vehicle in motion while the engine reduces its speed, will rotate the sun gear 76 to urge the centrifugal weights 135 and 136 outwardly, thereby moving the sun gear 76 forwardly in the manner just described. In addition thereto, the arms 137 and 138 engage roller bearings 142 mounted on the one-way brake 77, which unlocks the attached one-way brake 77. The roller bearing 142 slides freely in the axial direction on the extended shaft of the sun gear 76. This action is against the urgency of a spring 143 and the sun gear 76 is moved forwardly against the urgency of the spring 143. Thus, the forward planetary gear 25 is locked-up.

More specifically, when the engine speed reaches 20 m.p.h. and the accelerator pedal is released for the deceleration of the engine, the momentum of the vehicle continues to rotate the shaft 80 and the planet carrier 75. As the speed of the engine is reduced, the speed of rotation of the internal ring gear 71 is reduced. As a consequence thereof, the direction of rotation of the planet gears 72 and 73 is reversed. The planet gears 72 and 73 rotate in a counterclockwise direction. Thereupon, the sun gear 76 rotates from an at rest condition to a forward or clockwise direction. When this occurs, the weights 135 and 136, which are attached to the sun gear 76, become extended from the centrifugal force applied thereto. The integrally formed arms 137 and 138 of the weights 135 and 136, respectively, urge the roller bearing 142 into engagement with the housing of the one-way brake 77 to impart rotation to the one-way brake 77 in a direction for unlocking the same. The action of the weights 135 and 136 under the centrifugal force moves the sun gear 76 in the forward direction against the urgency of the spring 143. This allows the teeth 140 to mesh with the teeth 141 of the planet carrier 75. Now, the forward planetary gear 25 is locked-up. When the speed of rotation of the engine is reduced below 20 m.p.h., the urgency of the spring 143 overcomes the force of the weights 135 and 136, and thereby separates the teeth 140 on the sun gear 76 from the teeth 141 on the planet carrier 75. The planet gear 25 is again activated.

At this time, the forward planetary gear 25 is locked-up when the engine speed reaches 20 m.p.h. and the rear planetary gear is locked-up by the shifting of the shift lever 40 into drive position. There is a one-to-one torque multiplication between the input shaft 11 and the output shaft 12. The transmission 10 is now in direct dirve.

The vehicle again can be decelerated, the power and torque again going through the transmission 10 from the input shaft 11 to the output shaft 12. The transmission will automatically shift from low gear to direct drive at the preferred speed above 20 miles per hour. When the vehicle speed is less than 20 miles per hour, the spring 93 will be of sufficient force to move the sun gear 76 rearward against the urgency of the centrifugal weights 135 and 136 to disengage the teeth 140 from the teeth 141. The sun gear 76 will again be locked-up by the one-way brake 77.

When the vehicle speed exceeds 40 miles per hour, it is desired to shift the transmission 10 into overdrive automatically by unlocking the rear planetary gear 30 to thereby permit the automatic shift thereof into overdrive. Toward this end, the rear planetary gear 30 has to be unlocked and the sun gear 105 thereof must be held against rotation. The collar 81, being in engagement with the shaft 90 through the teeth 84 and 91, and the collar 92 being in engagement with the sun gear 105 through the teeth 107 and 106, remains this way while power is transmitted from the shaft 80. The teeth 107 and 106 have a prescribed angular form to prevent separation therebetween while the vehicle travels at a speed less than 40 m.p.h. When the vehicle travels at a speed in excess of 40 m.p.h., the teeth 107 and 106 will separate under the action of the centrifugal weights 94 and 95.

When the vehicle travels at a speed in excess of 40 m.p.h., the centrifugal weights 94 and 95 pivot outwardly against the urgency of the springs 99 and 102. The vehicle is decelerated momentarily to remove temporarily force on the mating teeth 107 and 106 to permit separation therebetween. The action of the centrifugal weights 94 and 95 pivoting outwardly slides the collar 92 forwardly through engagement with the wall of the groove 93. Thereupon, the teeth 107 and 106 separate. In addition thereto, a collar 150 is moved forwardly. As previously described, the springs 98 and 101 serve to assist the forward movement of the arms 96 and 97 once the springs 98 and 101 advance beyond the pivot point of the arms 96 and 97.

The collar 150 is splined internally to move in the axial direction through the exterior spline on the extended forward end of the sun gear 105. The collar 150 is pulled forward by the collar 92 through a sleeve 151 and suitable lug screws 152 held in a channel formed in the forward end of the collar 92. The sleeve 151 and lug screws 152 slide collar 150 axially with the movement of the collar 92. Formed on the collar 150 are teeth. Now, when the centrifugal weights 94 and 95 move outwardly when the vehicle speed exceeds a predetermined magnitude, not only do the teeth 107 move out of engagement with the teeth 106 because of the forward movement of the collar 92, but also the teeth on 150 move into engagement with the teeth 154 of a blocking ring 153 and also forwardly spaced teeth 155 on partition 107 because of the forward movement of the collar 150 pulled by the collar 92.

At the forward end of the blocking ring 153 is fixed a heavy washer 156. Between the washer 156 and a partition 157 is disposed a spring 158 to produce a synchronizing meshing between the teeth of the blocking ring 153 and the teeth 155 of the partition 157.

When the automatic shift of the collars 81 and 92 is completed, the rotation of the sun gear 105 stops because of the disengagement between the teeth 107 and 106, and also the rotation of the collar 150 stops because of engagement with the teeth of the blocking ring 153 and the teeth 155 of the partition 157. However, the shaft 80 continues to impart clockwise rotation to the shaft 90 through the meshing between the teeth 84 and 91. The shaft 90 is splined to the planet carrier 112 to impart rotation thereto. Rotation of the carrier 112 clockwise with the sun gear 105 restrained from rotating causes the planet gears 110 and 111 to travel around the sun gear 105 in a clockwise direction. This action causes the ring gear 115 to rotate clockwise at a speed greater than the speed of rotation of the carrier 112 and the shaft 90. Hence, the transmission 10 is in overdrive.

When the speed of the vehicle is reduced to a magnitude less than 40 m.p.h., the centrifugal force from the centrifugal weights 94 and 95 is insufficient to overcome the urgency of the springs 99 and 102. Hence the springs 99 and 102, which apply a greater force upon the weights 135 and 136 than does the springs 98 and 101, respectively, return the weights 94 and 95 to their initial position. As a consequence thereof, the arms 96 and 97 pivot inwardly. This results in the collars 150 and 92 shifting rearwardly again to lock-up the rear planetary gear 30 for returning the transmission 10 in direct drive. The blocking ring 126 and a spring 160 ensures synchronization in the meshing between the teeth 107 and the teeth 106.

For reversing the direction of rotation of the driven shaft 12, the vehicle is at a complete stop and the engine is idling. The shift lever 40 is moved to the neutral position and then the reverse position (FIG. 4). The detent 134 will first occupy the neutral groove 132 and then the reverse groove 131. In so doing, the shift lever 40 rotates the shift plate 123 clockwise as viewed in FIG. 4. In so doing, a follower 161 travels in an arcuate slot 162. Attached to the follower 161 is a plate 163, which moves with the follower 161. Fixed to the plate 163 is a shifting fork 164 (FIG. 1a) for movement therewith. Thus, the shift plate 123, the plate 163 and the shifting fork 164 will move in unison.

The shifting fork 164 is received in a slot 165 formed in the sun gear 105 of the rear planetary gear 30. When the shifting lever 40 is moved to the reverse position, the shifting fork 164 moves the sun gear 105 forwardly so that the teeth 106 thereof mesh the teeth 107 of the collar 92. As the sun gear 105 moves forwardly, the planet carrier 112 also moves forwardly. The planet carrier 112 is splined to the shaft 90 to allow lateral movement. The shaft 90 is restrained against lateral movement by a washer 170.

On the planet carrier 112 is a forward plate 171 with teeth 172 along the periphery thereof. The teeth 172 meshes with teeth 173 of a partition 175. The teeth 172 meshing with the teeth 173 locks the planet carrier 112 against rotation. When the shaft 80 rotates, it rotates the collars 81 and 92. The collar 92 is now attached to the sun gear 105 through the teeth 107 and 106. Thus, the sun gear 105 now rotates in the clockwise direction through the shaft 80, collar 81, collar 92, teeth 107 and teeth 106. Since the planet carrier 112 is restrained from rotating through the forward plate 171, teeth 172, teeth 173 and partition 175, the planet gears 110 and 111 will now rotate in the counterclockwise direction. Therefore, the ring gear 115 rotates in the counterclockwise direction. This action rotates the parking plate 116 in the counterclockwise direction and the shaft 12 in the counterclockwise direction.

Figure 3:
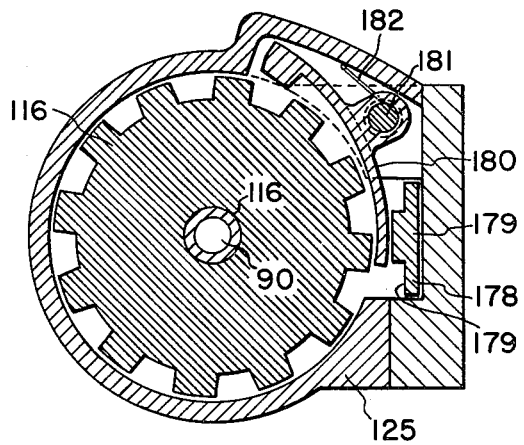

For shifting the transmission 10 into park after the vehicle has come to a complete stop, the shift lever 40 is moved to the park position. The action causes the shifting plate 123 to move in the clockwise direction (FIG. 4) with the detent 134 occupying the groove 130. The followers 81 and 161 will not move radially within the slots 122 and 162, respectively. However, a follower 176 in a slot 177 will move radially. Attached to the follower 176 is a plate 178, which moves forwardly with the radial movement of the follower 176. On the rear portion of the plate 178 is a bevelled rim 179. When the plate 178 moves forwardly, the rim 179 will release a dog 180 on the lower end of the parking plate 116 (FIGS. 2a and 3). When the parking dog 180 is released, a spring 182 (FIG. 3) will urge the forward end of the dog 180 into a matching groove formed in the peripheral edge of the parking plate 116 (FIG. 3). This action locks the parking plate 116 and restrains the vehicle against movement.

The parking dog 180 is supported by a pin 181 mounted on the transmission 10. The pin 181 provides a joint for the pivotal movement of the dog 180. To shift the transmission into drive, the shift lever 40 is shifted rearwardly. The bevelled end of the shift plate 178 strikes the lower end of the dog 180 raising its forward end from the notches along the periphery of the parking plate 116 to release the same. Thus, shifting the transmission 10 from park to reverse, the shift lever 40 is moved rearwardly through reverse position to neutral position and then to drive position.

I claim:
1. An automatic gear transmission for transmitting power from a drive shaft to a driven shaft comprising:
   a. a first planetary gear;
   b. first means rotated by said drive shaft for applying power to said first planetary gear;
   c. a second planetary gear having a sun gear with teeth;
   d. second means operated by the power output of said first planetary gear for applying power to said second planetary gear, said second means comprises a first shaft operated by said first planetary gear, a first collar with teeth mounted on said first shaft for rotation therewith, a second shaft with teeth adapted to be rotated by engagement with the teeth of said first collar, and a second collar with teeth mounted on said first collar for rotation therewith, the teeth of said second collar being adapted for engagement with the teeth of said sun gear for imparting rotation to said sun gear;
   e. third means operated by the power output of said second planetary gear for rotating said driven shaft;
   f. gear shift means connected to said second means for locking up said second planetary gear when disposed in a selected position, said gear shift means when disposed in said selected position moves said first collar to cause the teeth of said first collar to engage the teeth of said second shaft to impart rotation thereto and to cause the teeth of said second collar to mesh with the teeth of said sun gear to impart rotation thereto; and
   g. first speed responsive means connected to said first collar of said second means and operatively responsive to a first predetermined speed of rotation of said first collar of said second means for moving the teeth of said second collar from engagement with the teeth of said sun gear for automatically unlocking said second planetary gear for operating said automatic gear transmission in overdrive.

2. An automatic gear transmission as claimed in claim 1 wherein said first planetary gear includes a sun gear, and comprising second speed responsive means connected to said sun gear of said first planetary gear and operatively responsive to a second predetermined speed of rotation of said sun gear of said first planetary gear for locking up said first planetary gear.

3. An automatic gear transmission as claimed in claim 2 wherein said first speed responsive means comprises centrifugal weights and said second speed responsive means comprises centrifugal weights.

4. An automatic gear transmission as claimed in claim 1 wherein said teeth of said second collar and the teeth of said sun gear of said second planetary gear are formed with predetermined angular mating relation to inhibit separation while said first collar rotates at a speed less than said first predetermined speed.

* * * * *